Figure 1:
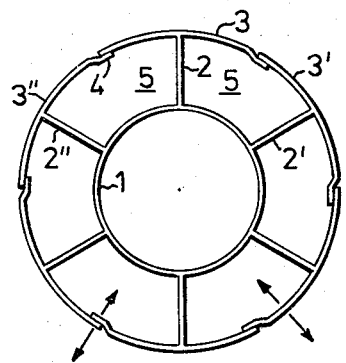

United States Patent [19]
Lilja et al.

[11] 3,889,715
[45] June 17, 1975

[54] ARRANGEMENT IN A PIPE FOR ENCLOSING INSULATION

[76] Inventors: Lars Harry Lilja, Solhem, Aspen; Charles Folke Sigvard Ottoson, von Holtens vag 5, both of S-443 00 Lerum, Sweden

[22] Filed: June 26, 1973

[21] Appl. No.: 373,687

[30] Foreign Application Priority Data
Jan. 10, 1972 Sweden.............................. 213/72

[52] U.S. Cl.............. 138/117; 138/149; 174/110 F; 264/45
[51] Int. Cl........................... F16l 9/18; F16l 59/12
[58] Field of Search..................... 138/149, 112–117, 138/141, 162, 166, 148, 156, 151, 108; 285/74 PB; 46/27; 165/179; 29/455; 264/45; 174/110 F

[56] References Cited
UNITED STATES PATENTS

| | | | |
|---|---|---|---|
| 1,110,008 | 9/1914 | Ripley | 138/162 |
| 2,810,233 | 10/1957 | Jakobsen | 46/28 |
| 2,937,662 | 5/1960 | Green | 138/148 X |
| 3,007,208 | 11/1961 | Urban | 264/45 |
| 3,144,881 | 8/1964 | Sproull | 138/117 X |
| 3,528,456 | 9/1970 | Scheffler | 138/113 |
| 3,559,660 | 2/1971 | Rollins | 138/149 |
| 3,563,825 | 1/1965 | Segura et al. | 138/151 X |
| 3,636,985 | 1/1972 | Burchett | 138/162 |

FOREIGN PATENTS OR APPLICATIONS

| | | | |
|---|---|---|---|
| 759,179 | 10/1956 | United Kingdom | 248/74 PB |
| 362,995 | 4/1906 | France | 165/179 |

Primary Examiner—Richard C. Queisser
Assistant Examiner—Daniel M. Yasich
Attorney, Agent, or Firm—Finnegan, Henderson, Farabow & Garrett

[57] ABSTRACT

The invention concerns an arrangement in pipes for enclosing pipe insulation, which arrangement consists of a cylindrical jacket being concentric with the pipe, and of flanges projecting substantially radially from the surface of the jacket facing the pipe, the flanges being connected to the pipe or resting against the same. The arrangement is characterized in that it comprises a plurality of elements, each element consisting of an outer portion which is constructed as a part of the cylindrical jacket having a straight or substantially arcuate cross section and of one of the flanges being connected to or abutting the pipe, the longitudina' edges of each outer portion overlapping with, lying against or being detachably connected to the edge of the adjacent outer portion.

10 Claims, 5 Drawing Figures

ARRANGEMENT IN A PIPE FOR ENCLOSING INSULATION

The present invention relates to an arrangement in pipes for enclosing pipe insulation comprising a cylindrical jacket concentric with the pipe and flanges extending essentially radially from the surface of the jacket facing the pipe, said flanges being connected to the pipe or lying against it.

A previously known arrangement for enclosing insulation around pipes comprises a protective tubing or jacket which with various intermediate layers is disposed essentially concentrically around the pipe which is to be insulated. The insulation is then done by filling with or injecting an appropriate insulation material from one end of the pipe. In this arrangement the length of the pipe is limited for practical reasons. Furthermore this arrangement is only useable for straight pipe since each bending would jeopardize the concentricity of the outer and inner tubes, thereby producing a heat bridge with leakage losses as a result.

The production of insulating pipe is also previously known by strip insulation material being wound onto the pipe, by tubular pipe halves of insulating material being applied from the outside onto the pipe and fastened to the same by casting and filling of insulation material around the pipe.

All of the previously known arrangements or methods for insulation pipe have the disadvantages that they are time consuming and that the insulated pipes can only be produced in limited lengths. As a rule there are difficulties in splicing the finished pipes.

The purpose of the present invention is to eliminate the above-mentioned disadvantages in insulated pipe. Another primary aim is to make possible the production of insulated pipe of unlimited length. Additional purposes are to give the pipe a homogeneous insulation, peripherally as well as longitudinally, and to make possible a quick and simple insulation of pipe at the same time as it is laid out.

In the arrangement according to the invention this is achieved by the arrangement comprising a number of elements, each consisting of an outer portion constructed as a part of the cylindrical jacket having a straight or essentially arc-shaped cross section and of one of the flanges connected to or lying against the pipe. The longitudinal edges of each outer portion overlap with and lie against or are detachably connected to the edge of the adjacent outer portion.

Other aims and characterizing features of the arrangement according to the invention are disclosed in the accompanying claims.

Some preferred embodiments of the invention will be described in detail in the following with reference to the enclosed FIGS. 1–5, all of which show an end view of an embodiment of a pipe provided with an arrangement according to the invention for enclosing pipe insulation.

According to FIG. 1 pipe 1, which is to be insulated, is constructed as one piece with a number of radial flanges 2 which at their outer edges pass directly into outer portions 3 with a cross section which coincides with a part of a cylindrical jacket. Each of these outer portions 3 extends essentially the same distance from the flange 2 on both sides of said flange and has such an arc length that the outer edges overlap the outer edges of the adjacent outer portions 3' and 3''. There are so many elements consisting of flange 2 and outer portion 3 that the pipe 1 is surrounded by a jacket which is formed of the outer portions 3, 3', 3'' etc. which are shaped as parts of the cylindrical jacket. One edge of each portion 3 is preferably provided with a simple pocket 4 so that the jacket has a flat outer surface even within the area of overlap. Between the two adjacent flanges, e.g. flanges 2, 2' or 2, 2'' and the enclosed portions of the pipe 1 and the outer portion 3, 3' or 3, 3'' respectively, a space 5 is formed with a cross section in the shape of a ring section. This space is designed to be filled with pipe insulation, e.g. foam rubber.

The pipe 1 with its flanges 2 and outer portions 3 can be extruded from a material which is suitable for the fluid passing through the pipe 1. This material should have sufficient elasticity however, so that the outer portions 3, 3', 3'' etc. constructed as parts of the cylindrical jacket can be pressed radially outwards and inwards by means of an extrusion nozzle for plastic material when insulation is to be inserted in the spaces 5. In the insulating process this nozzle can be moved in the longitudinal direction of the pipe 1, the overlap seam opening in front of the nozzle and closing again after it.

Figure 2:
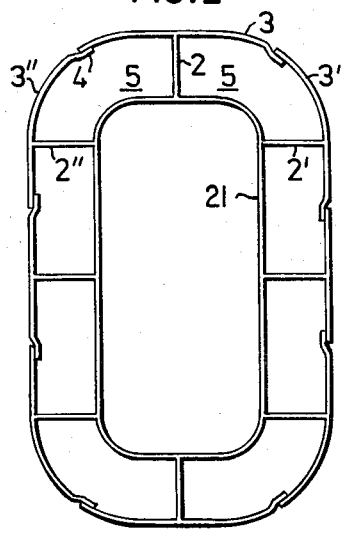

FIG. 2 shows a second embodiment of the invention which in principle agrees completely with the embodiment according to FIG. 1 with the exception that the pipe 21 is not circular. In this connection it should be pointed out that the expression "cylindrical jacket", which is used in the present description and accompanying claims, is not restricted to refer to a circular cylindrical jacket. FIG. 2 also shows that the extending flanges can be constructed on some of the outer portions, e.g. 3'', which form the surrounding jacket. These outer flanges serve as spacers between the insulated pipe and a support.

Figure 3:
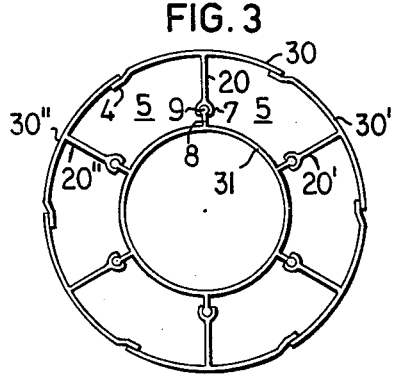

In the embodiment according to FIG. 3 the elements consisting of flanges 20 and outer portions 30 are units which are not joined fast with the pipe 31. Rather they are removably attached to the same. To make this possible each flange 20 is shaped like a fork 7 along its inner edge. The tines of the fork are bent towards each other. The pipe 31 is provided with longitudinal radial fins 8 in a number which corresponds to the number of elements 20,30. On their outer edges these fins are provided with an essentially circular bead 9. The elements consisting of outer portion 30 and flange 20 can be mounted on the pipe 31 by forcing the tines of the fork by radial pressure to snap over the beads 9 of the fins 8. With this embodiment it is possible to construct the pipe 31 and the elements 20,30 of different suitable materials, e.g. with different thermal conducting properties. Heat losses can then be held to a minimum by placing the snap connection nearer to the cylindrical jacket which is produced from the material with the higher thermal conductance.

Figure 4:
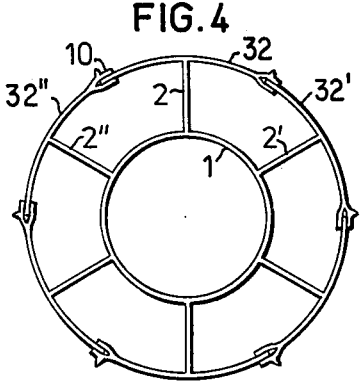

FIG. 4 shows another embodiment of the invention which only differs from the embodiment according to FIG. 1 in that the outer portion 32 constructed as a part of the cylindrical jacket is not single-grooved along one longitudinal edge. Instead the edge is constructed as a fork 10 which surrounds the edge of the adjacent outer portion 32'. The embodiment according to FIG. 4 can of course comprise snap connections according to FIG. 3, if desired.

Figure 5:
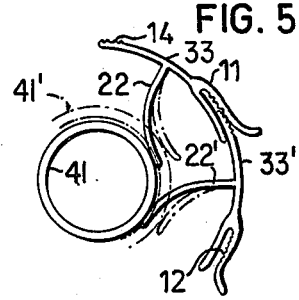

FIG. 5 shows a somewhat different embodiment which can be used in pipes of different diameters. The arrangement for enclosing insulation in this case also comprises a number of units, each of which consists of an outer portion 33 constructed as a part of a cylindrical jacket, and an essentially radially extending flange 22. One longitudinal edge of the outer portion 33 is constructed as a fork 11 with a relatively large depth. The inside of at least one of the fork tines, preferably the outer, is provided with longitudinal ridges or teeth 12. The opposite longitudinal edge of the outer portion is likewise provided with longitudinal ridges or teeth 14 on one or both of its sides. When this edge with the teeth 14 is inserted into the fork 11 of the adjacent outer portion 33, the two outer portions are locked to one another. The outer tine of the fork 11 can also be bent outward somewhat to make it easier to break the connection with the adjacent portion when the insulation is to be inserted.

In this embodiment the flange 22 is somewhat bent away from the radial direction, at least within its outer rim portion. When the units consisting of outer portion 33 and flange 22 are disposed around a pipe 41, the convex surface of the bent flange 22 will come into contact with the outer surface of the pipe 41 and is bent towards the outer portion 33. The elements 22,33 can thereby be used in pipes 41, 41' with different diameters as according to FIG. 5. The thickness of the insulation is varied by the elements 22,33 being pressed more or less strongly against the pipe 41. These variations are taken up by a greater or lesser bending of the flanges 22 and by the edges with teeth of the outer portions 33 being pressed a shorter or longer distance into the cooperating fork 11.

In all of the embodiments shown, with the exception of that shown in FIG. 2, the elements made up of outer portion and flange, possibly only the flanges, can be so constructed that they extend spirally around the pipe. The flexibility of the pipe is improved thereby.

Appropriate materials for the production of an arrangement for enclosing insulation and possibly a pipe to be used in said arrangement are extrudable plastics or metals such as polyethylene and aluminum, respectively.

In addition to the advantages mentioned for the insertion of the insulation and the subsequent possibility of producing longer pipe units it can also be stated that an insulated pipe according to the invention has the following advantages.

1. The inner pipe is securely centered in the outer jacket since the flanges between them assure a constant separation.

2. The heat leakage will be quite low as a result of the even thickness of the insulation around the whole pipe.

3. The pipe can be laid with curves, especially when the elements consisting of outer portion and flange extend spirally around the pipe.

4. The inner pipe, flanges and surrounding jacket can be optionally produced from the same material or of two different materials.

The embodiments described above and illustrated in the drawings should, however, only be regarded as examples, since the invention can be modified in many respects without deviating from the scope of protection defined in the accompanying claims. Thus the insulation can be made from pre-moulded insulating strips instead of by injection.

What we claim is:

1. Means for enclosing an insulation around a pipe comprising
   a. a jacket spaced from said pipe in a substantially concentric manner to define an annular space around said pipe, said jacket being divided along a plurality of longitudinally extending lines at spaced circumferential positions thereabout so as to form a plurality of jacket portions, the edges along the line of division of each pair of adjacent jacket portions maintained in overlapping and resilient abutting relationship with each other, the overlapping relationship maintained by the resiliency of the abutting jacket portions;
   b. a plurality of longitudinally extending flanges, one for each jacket portion, each flange having an outer edge connected to the inner surface of the cooperating jacket portion between the edges thereof and extending in a substantially radial direction therefrom, each flange furthermore having an inner edge connected to the outer surface of said pipe, said flanges dividing the annular space into a plurality of longitudinally extending compartments, one between each pair of adjacent flanges;
   c. said overlapping edges of each pair of adjacent jacket portions being resiliently separable by the pressure exerted by a means inserted therebetween for introducing insulation into said compartments.

2. Means as recited in claim 1 wherein the inner edges of said flanges are integral with said pipe.

3. Means as recited in claim 1 wherein the inner edges of said flanges are detachably connected to said pipe.

4. Means as recited in claim 3 wherein said pipe includes a number of longitudinally extending and circumferentially spaced fins protruding therefrom in a substantially radial direction with cooperative means on the inner edge of each of said flanges and said fins for forming a snap-lock engagement between said fins and said flanges.

5. Means as recited in claim 1 wherein the edges of said jacket along each of said lines of division overlap each other with one of said edges being offset and the other edge overlapping said offset edge.

6. Means for enclosing an insulation around a pipe comprising
   a. a jacket spaced from said pipe in a substantially concentric manner to define an annular space around said pipe, said jacket being divided along a plurality of longitudinally extending lines at spaced circumferential positions thereabout so as to form a plurality of jacket portions, the edges along the line of division of each pair of adjacent jacket portions maintained in overlapping and resilient abutting relationship with each other, the overlapping relationship maintained by the resiliency of the abutting jacket portions;
   b. a plurality of longitudinally extending flanges, one for each jacket portion, each flange having an outer edge connected to the inner surface of the cooperating jacket portion between the edges thereof and extending in a substantially radial direction therefrom, each flange furthermore having an inner edge connected to the outer surface of said pipe, said flanges dividing the annular space into a plurality of longitudinally extending compartments, one between each pair of adjacent flanges;

c. cooperative means on the edges of said jacket portion along each of said division lines for engageably coupling said edges together, said cooperative means having two members, one of said members being forked, d. said overlapping edges of each pair of adjacent jacket portions being resiliently separable by the pressure exerted by a means inserted therebetween for introducing insulation into said compartments.

7. Means as recited in claim 6 wherein one of the edges along said lines of division is foreed shaped in cross-section, having a pair of spaced tines, and the opposite edge along said line of division is engageably received between said tines.

8. Means as recited in claim 7 wherein the inner surface of at least one of said times is serrated with teeth and the surface of the 9. Means as recited in claim 6 wherein said cooperative means is comprised of one of said edges being fork shaped in cross-sectional configuration defining opposed-spaced tines and wherein the opposed jacket edge is square cut and received between said tines in resilient engagement to couple said edges together.

10. Means as recited in claim 9 wherein at least one of said tines is serrated on its inner surface to provide teeth and wherein a surface of said opposite edge is correspondingly serrated to provide locking engagement therebetween.

* * * * *

UNITED STATES PATENT OFFICE
CERTIFICATE OF CORRECTION

Patent No. 3,889,715            Dated June 17, 1975

Inventor(s) Lars Harry Lilja et al

It is certified that error appears in the above-identified patent and that said Letters Patent are hereby corrected as shown below:

Column 5, line 13, "foreed" should read --forked--.

Column 6, line 3, after "the" (second occurrence) insert --opposite edge is correspondingly serrated to provide a locking engagement between said edges.--

Signed and Sealed this twenty-sixth Day of August 1975

[SEAL]

Attest:

RUTH C. MASON
*Attesting Officer*

C. MARSHALL DANN
*Commissioner of Patents and Trademarks*